June 19, 1962   H. D. EPSTEIN   3,040,283
ELECTRICAL HEATER ASSEMBLY
Original Filed May 21, 1956

Inventor,
Henry David Epstein,
by Harold Levine Atty.

United States Patent Office 3,040,283
Patented June 19, 1962

1

3,040,283
ELECTRICAL HEATER ASSEMBLY
Henry David Epstein, Boston, Mass., assignor to Texas Instruments Incorporated, Dallas, Tex., a corporation of Delaware
Original application May 21, 1956, Ser. No. 586,113, now Patent No. 2,960,757, dated Nov. 22, 1960. Divided and this application June 16, 1960, Ser. No. 43,265
2 Claims. (Cl. 338—329)

This invention relates to an improved electrical heater assembly.

An object of this invention is to provide an improved electrical heater assembly.

A further object of this invention is to provide an electrical heater assembly which includes a heating element welded to one or more terminals and having its entire exposed surface uniformly oxidized.

A further object of the invention is to provide a novel heater assembly which effectively retains its calibration, which can be relied upon to provide its intended functions at wider and higher temperature ranges and which is durable, inexpensive and economical to produce.

A further object of the invention is to provide a novel heater assembly in which distortion and stretching of the heating element is materially reduced, and the entire exposed surface of which heating element is uniformly oxidized and the quality of the oxide at the exposed surface of the heating element is improved.

A further object of the present invention is to provide a novel heater assembly in which substantially all portions of the exposed surface of the heater are uniformly insulated from those adjacent thereto.

A further object of this invention is to provide a novel heater assembly in which substantially the entire exposed surface of the heating element is uniformly oxidized and at least a portion of the exposed surface of a terminal structure, to which the heating element is bonded, is non-oxidized.

Still another object of this invention is to provide a novel heater assembly, which heater assembly is simple in construction, efficient, economical to manufacture, and which avoids or at least minimizes the use of jigs or fixtures for the manufacture thereof.

The invention accordingly comprises the elements and combinations of elements, features of construction, and arrangements of parts which will be exemplified in the structures hereinafter described, and the scope of the application of which will be indicated in the following claims.

This is a division of application 586,113, filed May 21, 1956, now Patent No. 2,960,757.

In the accompanying drawings, in which is illustrated one of the various possible embodiments of the invention:

Figure 5:
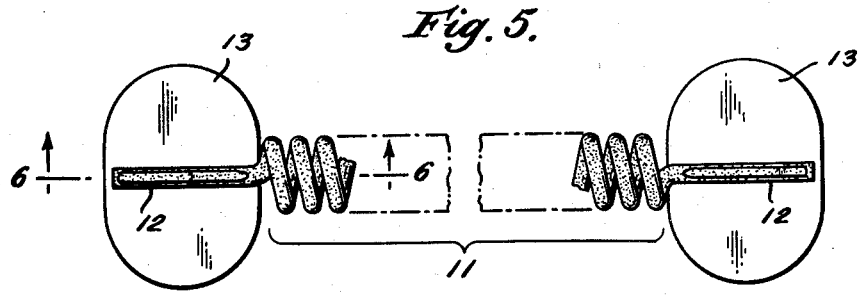
FIG. 5 is a plan view showing an assembly whereby the heating element of FIG. 1 is bonded to two of the FIG. 2 terminals and the entire exposed surface has been uniformly oxidized as indicated by the stippling in this view.
Figure 6:
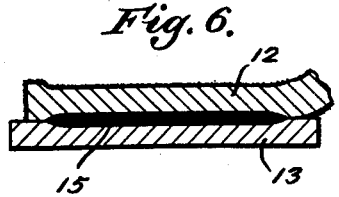
FIG. 6 is a sectional view taken along line 6—6 of FIG. 5.

Common desiderata of an electrical heater assembly such, for example, as that set forth in the environment illustrated in FIGS. 5 and 6 of United States Letters Patent 2,501,156, granted March 21, 1950, to J. D. Bolesky, is that the heating element be bonded to electrical terminal structure, that the exposed surface of the heating element be electrically insulating, and that the exposed surface of the terminal structure be electrically conductive. Obviously, if a portion of the electrical heating element were to short out with another portion thereof or with other adjacent structure, the intended purposes and functions of the assembly would be defeated. Since such heating elements are often provided in coiled or otherwise configured forms whereby two or more portions of such elements lie closely adjacent each other, it is clear that it is highly desirable that the entire exposed surface of the heating element be uniformly electrically insulating. The terminal structure, of course, provides means for electrical connection of the heating element to its source of electrical potential, and it is oftentimes desired that the exposed surface thereof be in non-oxidized condition, for example, to facilitate soldering a lead wire thereto.

In general, a convenient method of insulating the exposed surface of an electrical conductor is to oxidize this surface. To form an electrical heating assembly wherein the surface of the heating element is oxidized and the terminal structure is not, the surface of the heating element could be separately oxidized in any suitable manner, and then the heating element could be subsequently bonded to suitable terminal structure. This procedure is expensive and time-consuming in that it requires that portions of the heating element, after they have been oxidized, be cleaned by abrading or otherwise. For example, to resistance-weld the heating element to a terminal, that portion of the heating element to be bonded to the terminal must be substantially free of oxides, and also, that portion to which the welding electrode is connected must likewise be so cleaned. Practically, it is impossible to render the entire exposed surface of the heating element in oxidized form by this procedure since the portion of the heater unit, to which the electrode is connected for the welding process, remains non-oxidized.

Another conventional procedure to provide a heater assembly of this type would be first to bond the heating unit to the terminal structure and then pass an electrical current through the assembly to bring the heating element to a red heat. When the heating element is so heated in air, a substantial portion of the heating unit will be oxidized. However, a number of disadvantages accrue to this method, namely: it is expensive, time-consuming and involves a great deal of heater distortion and stretching which, in turn, requires extensive fixturing. Also, and operhaps more importantly, by this method the portions of the heating element which lie closely adjacent the terminal structure do not heat up to the same temperature as the more remote portions thereof with the result that these closely adjacent portions do not oxidize properly.

It is well known that controlled atmospheres can be provided which, depending upon a number of different variables, will be effective to oxidize or to reduce the surface of a given metal. In the main, these variables are: the components of the atmosphere or gas; the dew point of this atmosphere; the temperature to which the metal is heated in this atmosphere; and the particular metal whether it be in elemental form, in the form of an alloy, or otherwise. For a given metal and a given atmosphere, the lower the dew point of the atmosphere and the higher the temperature to which the metal is heated in the atmosphere, the greater the tendency for that atmosphere to act as a reducing atmosphere and the lesser the tendency for that atmosphere to act as an oxidizing atmosphere. An equilibrium temperature exists for each of these controlled atmospheres above which reduction of a given metal occurs and below which oxidation of that metal occurs. By way of example, chromium is in equilibrium with an atmosphere of hydrogen when that atmosphere has a dew point of 0° F. and the chromium is heated to a temperature of 3000° F. If the chromium is heated to a temperature substantially above 3000° F., this atmosphere of hydrogen having a dew point of 0° F. will reduce the chromium; and if the chromium is heated to a temperature substantially below 3000° F., this same atmosphere will oxidize the chromium.

This phenomenon is utilized by this invention in a manner which will be come apparent as the description proceeds.

Figure 1:
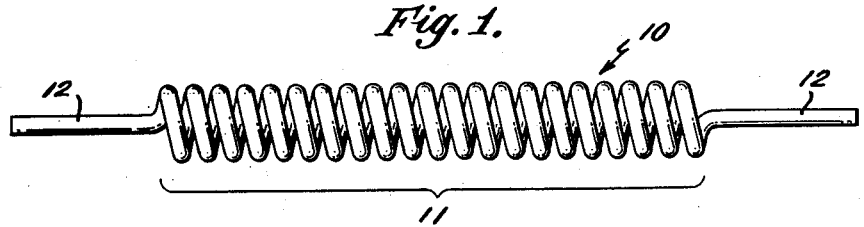
FIG. 1 is a plan view of one form of electrical heating element which may be utilized by this invention.
Figure 2:
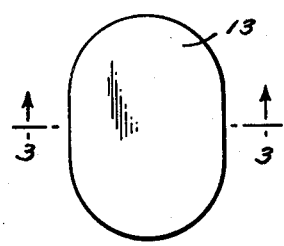
FIG. 2 is a plan view of an electrical terminal which may be utilized by this invention.
Figure 3:
FIG. 3 is a sectional view taken along line 3—3 in FIG. 2.

Referring to the drawings, an electrical heating element 10 is provided which is formed of metal having a comparatively high electrical resistivity. Heating element 10 may be provided as shown in FIG. 1 whereby a portion 11 is made up of a plurality of closely adjacent coils. At each end of the heating element is an integral projecting portion 12, 12. By way of example, the metal of which heating element 10 is formed could be "Chromel-C" alloy, "Chromel-D" alloy, or "Alloy #732." "Chromel-C" alloy comprises 60% nickel, 16% chromium and the remainder iron. "Chromel-D" alloy comprises 35% nickel, 18.5% chromium and the remainder iron. "Alloy #732" is a variation of "Chromel-C" alloy which is vacuum-melted and contains slightly more iron than "Chromel-C" alloy. Each of these alloys is commercially available from Hoskins Manufacturing Company, Detroit, Michigan.

Figure 4:
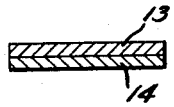
FIG. 4 is a view similar to FIG. 3 but further including a contact portion carried by the terminal.

Also provided are one or more electrical terminals 13. Each of terminals 13 is formed of metal having a substantially higher conductivity than the metal of which heating element 10 is formed. This metal may be any of a number of conventional terminal-forming metals, and preferably one which can be welded to heating elements such as described above. Examples are Monel and nickel. As shown in FIG. 4, terminal 13 may be provided with a contact-forming portion 14, such as silver. Contact 14 is bonded to terminal 13 in any suitable manner.

According to this invention, heating element 10 is bonded to one or more terminals 13 as shown in FIG. 5. This bond may be conveniently formed by resistance-welding to form a weld 15 as shown in FIG. 6.

After bonding the heating element to one or more terminals, the bonded assembly is placed in a controlled atmosphere and the assembly is heated to a predetermined temperature range at which this atmosphere acts as a reducing atmosphere with respect to the metal of which the terminal is formed and as an oxidizing atmosphere with respect to the metal of which the heating element is formed. In order for this controlled atmosphere so to function as both a reducing atmosphere and an oxidizing atmosphere, the above-mentioned variables must be properly adjusted. According to one preferred adjustment of these variables, the terminal or terminals are formed of an alloy comprising substantially 60% nickel and the remainder copper, the heating element is formed of "Chromel-C" alloy, the atmosphere is provided in the form of cracked city gas having a dew point of approximately 60–70° F. (sample tests indicate that this gas comprises approximately 5–7% carbon monoxide, 12% carbon dioxide, 5–7% hydrogen and the remainder nitrogen and water vapor) and the bonded assembly is heated to a temperature of from approximately 1550° F. to approximately 1600° F. Under these conditions, this atmosphere will act as an oxidizing atmosphere with respect to the heating element whereby the entire exposed surface of the heating element will be uniformly oxidized (as indicated by the stippling in FIGS. 5–7); and this atmosphre will act as a reducing atmosphere with respect to the terminals whereby the exposed surface of the terminals will be non-oxidized. In accomplishing this last step one or more of the bonded assemblies may be merely dropped into a pan which may then be disposed in the gas-filled heating chamber of a furnace prior to heating the assemblies. Numerous other adjustments of these variables will suggest themselves in the light of this disclosure.

Figure 7:
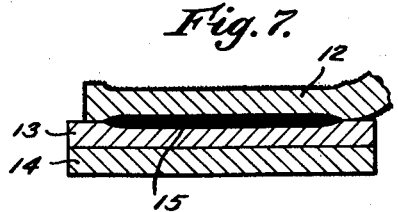
FIG. 7 is a view similar to FIG. 6 but further including a contact carried by the terminal.

In the case where the electrical terminal or terminals carry a contact-forming portion of precious metal such as silver which has a melting point considerably lower than that of the other parts of the assembly, the above-mentioned variables must be adjusted so that the melting point of the metal of the contact-forming portion lies above the range to which the bonded assembly is heated in the controlled atmosphere. Since the melting point of silver is significantly above 1600° F., one or more terminals having a contact portion 14 of silver as shown in FIG. 7 may be substituted in the above-described specific example for corresponding terminals 13 as indicated in FIG. 6.

By this improved process the oxide formed on the exposed surface of the heating element is much more permanent and has a higher insulating quality than that obtained by passing a current through the heater assembly to oxidize the heating unit in air. Furthermore, by this improved method the entire surface of the heating element is uniformly oxidized in contradistinction to that formed by the previously-described methods. In fact, since the entire exposed surface of the heating unit is uniformly oxidized to and including the extreme end portions of the latter, a heater assembly produced according to this improved process is distinguishable by simple visual examination from such an assembly formed by any other known method. Since the entire surface of the heating element is uniformly oxidized by the method of this invention, the operating temperature to which the heating element may be raised is not limited by one or more portions of the element, the exposed surfaces of which would otherwise be less well oxidized. Furthermore, the heating unit, when formed by this improved method, has higher strength than that when formed by passing an electrical current through it in air since it is not as greatly annealed. Also, distortion and stretching of the heating element during the improved process is substantially reduced if not avoided altogether and therefore no fixturing or jigging is ordinarily required for the practice of this process.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:
1. An electrical heater assembly comprising a heating element formed of an alloy comprising substantially 60% nickel, 16% chromium and the remainder iron, and an electrical terminal formed of an alloy comprising substantially 60% nickel and the remainder copper, a portion of said terminal being bonded to said heating element; said terminal at another portion thereof, carrying an electrical contact including a portion formed of silver, said terminal and said contact having a non-oxidized exposed surface and said heating element having an exposed surface which is entirely and substantially uniformly oxidized.

2. An electrical heater assembly comprising an oxidizable metallic heating element having two end portions; a portion of an electrical terminal welded to one of said end portions of said heating element; said terminal comprising a composite member formed of a plurality of layers; one of said layers comprising an oxidizable base metal and another of said layers formed of a precious metal; said welded portion of said electrical terminal being formed of said oxidizable base metal layer; said heating element, including said end portions, having an exposed surface which is entirely and substantially uniformly oxidized and said portion of said terminal being non-oxidized.

References Cited in the file of this patent

UNITED STATES PATENTS

| | | |
|---|---|---|
| 1,865,208 | Pilling et al. | June 28, 1932 |
| 2,418,460 | Buehler | Apr. 8, 1947 |
| 2,935,718 | Frost | May 3, 1960 |